(12) United States Patent
Coates et al.

(10) Patent No.: US 8,999,017 B2
(45) Date of Patent: Apr. 7, 2015

(54) METHOD AND APPARATUS FOR FAST PYROLYSIS OF BIOMASS IN ROTARY KILNS

(75) Inventors: Ralph L. Coates, Salt Lake City, UT (US); Benjamin R. Coates, Highland, UT (US); Joshua L. Coates, Holladay, UT (US)

(73) Assignee: Coates Engineering, LLC, Salt Lake City, UT (US)

( * ) Notice: Subject to any disclaimer, the term of this patent is extended or adjusted under 35 U.S.C. 154(b) by 825 days.

(21) Appl. No.: 13/227,044

(22) Filed: Sep. 7, 2011

(65) Prior Publication Data

US 2012/0063965 A1 Mar. 15, 2012

Related U.S. Application Data

(60) Provisional application No. 61/381,619, filed on Sep. 10, 2010.

(51) Int. Cl.
| | | |
|---|---|---|
| *C01B 6/24* | (2006.01) | |
| *C10B 21/00* | (2006.01) | |
| *C01B 3/24* | (2006.01) | |
| *C10B 47/30* | (2006.01) | |
| *C10B 53/02* | (2006.01) | |
| *C10C 5/00* | (2006.01) | |

(52) U.S. Cl.
CPC ............... *C10B 47/30* (2013.01); *C10B 53/02* (2013.01); *C10C 5/00* (2013.01); *Y02E 50/14* (2013.01)

(58) Field of Classification Search
CPC .................................. C10B 1/10; B08B 9/045
USPC ................................................ 48/61; 202/100
See application file for complete search history.

(56) References Cited

U.S. PATENT DOCUMENTS

| | | |
|---|---|---|
| 2,723,226 A | 11/1955 | Lesher |
| 4,116,810 A | 9/1978 | Jones et al. |
| 4,181,491 A | 1/1980 | Hovis |
| 4,218,304 A | 8/1980 | Styring |
| 4,425,220 A | 1/1984 | Kestner |
| 4,439,209 A | 3/1984 | Wilwerding et al. |
| 5,068,010 A | 11/1991 | Mundstock et al. |
| 5,254,139 A | 10/1993 | Adams |
| 5,308,596 A | 5/1994 | Kotzian et al. |
| 5,312,599 A | 5/1994 | Schwartz, Jr. |
| 5,393,225 A | 2/1995 | Frieberger et al. |

(Continued)

FOREIGN PATENT DOCUMENTS

WO WO 2009/062528 5/2009

*Primary Examiner* — Matthew Merkling
(74) *Attorney, Agent, or Firm* — Pate Peterson, PLLC; Brett Peterson (57) ABSTRACT

Described herein are systems and methods for achieving fast pyrolysis of wood and other carbonaceous solids in rotary reactors. Novel heating, feeding and condensing methods result in high oil yields near those currently achieved with more complicated fast pyrolysis systems. High intensity burners are arranged and controlled to produce high heating rates and uniform temperature of the rotating cylindrical walls of the reactors. The feeding system delays the onset of pyrolysis until the solids fall onto the heated kiln walls. The pyrolysis gases and vapors are rapidly withdrawn and quenched with recycled liquids. The first condenser incorporates a clean out nozzle. Char products are readily separated and discharged into a heat exchanger where heat is recovered and used together with heat from reactor flue gas to dry the solids prior to being fed to the reactor.

21 Claims, 9 Drawing Sheets

(Section AA of Fig. 1)

(56) References Cited

U.S. PATENT DOCUMENTS

| | | |
|---|---|---|
| 5,662,052 A | 9/1997 | McIntosh et al. |
| 5,728,271 A | 3/1998 | Piskorz et al. |
| 5,961,786 A | 10/1999 | Freel et al. |
| 5,997,288 A * | 12/1999 | Adams ......................... 432/105 |
| 6,485,841 B1 | 11/2002 | Freel et al. |
| 7,101,463 B1 | 9/2006 | Weinecke et al. |
| 2009/0139851 A1 | 6/2009 | Freel |
| 2009/0266380 A1 * | 10/2009 | Freel et al. ........................ 134/8 |
| 2010/0294700 A1 | 11/2010 | Coates et al. |

* cited by examiner

Fig. 1 (Section BB of Fig. 3)

Fig. 2 (Section BB of Fig. 3)

Fig. 3 (Section AA of Fig. 1)

Fig. 4 (Section CC of Fig. 3)

Fig. 11 (Section BB of Fig. 3)

METHOD AND APPARATUS FOR FAST PYROLYSIS OF BIOMASS IN ROTARY KILNS

PRIORITY

The present application claims the benefit of U.S. Provisional Application Ser. No. 61/381,619, filed Sep. 10, 2010, which is herein incorporated by reference in its entirety.

THE FIELD OF THE INVENTION

The present invention relates to apparatus and methods for converting biomass and sorted municipal solid waste to liquid ("bio oil"), solid char and gases by heating the biomass in a substantially non-oxidizing atmosphere. More specifically, the invention is directed to fast pyrolysis of biomass in indirectly heated rotary reactors.

BACKGROUND

Various apparatus and methods for fast pyrolysis of biomass such as wood, bark, grasses and legumes to produce bio oil and char are well known. While fast pyrolysis is related to traditional methods and apparatus for making charcoal, fast pyrolysis is a modern process in which the heating is carefully controlled to give high yields of bio oil rather than charcoal. Wood or other biomass is heated as rapidly as possible to temperatures in the range of 350° C. to 550° C. causing decomposition reactions that produce gases, oil vapors and charcoal or char. The vapors are cooled and condensed as rapidly as possible forming bio oil. The bio oil can be used as a heating fuel or upgraded for use as a motor fuel. Slow pyrolysis and slow vapor cooling and condensation such as occurs in the conventional charcoal manufacturing yields smaller amounts of oil and greater amounts of charcoal and non-condensable gases.

Many different reactor designs have been studied in the development of fast pyrolysis during the past thirty years. A common design approach is a reactor enabling the rapid mixing of a small quantity of finely ground biomass particles with large quantities of heated sand particles. Transported beds, circulating fluid beds, bubbling fluidized beds, auger mixing and rotating cones have been used. In a recent variation of this approach heated metal particles replace sand.

A list of reported fast pyrolysis reactors worldwide, both industrial and research, was presented in a recent publication, International Energy Agency Bioenergy Agreement Task 34, Pyrolysis, PyNe Newsletter #27, June 2010. Of the 44 industrial reactors, 12 are classified as fluid or bubbling bed, 9 are classified as circulating or transported bed, and 9 are classified as auger or screw. No rotating reactors are listed. The three major classifications are described in the following to provide a basis for evaluating the advantages of the present invention.

The largest existing fast pyrolysis reactor is the 8,000 kg/hr bubbling bed unit constructed in 2007 by Dynamotive at Guelph, Ontario, Canada. U.S. Pat. No. 5,728,271 describes the apparatus and method of operating this reactor. Biomass solids are dried to less than 10% moisture and ground to less than 3 mm in the shortest dimension. Inert solid particles, typically silica sand, smaller than 20 mesh (0.84 mm) is specified as the fluidized bed heat transfer material. The fluidizing gas is recycled pyrolysis gas, the flow rate being such that the mass ratio of fluidizing gas to biomass is less than 2:1. The superficial velocity of the fluidizing gas through the bed should be in the range 10-80 cm/sec and its residence time in the reactor should be in the range of 2-25 seconds. The patent further specifies that the fluidized bed is heated indirectly by hot gases and an embodiment is described with the hot gases flowing through tubes passing through the bed. The hot gases are created by combustion of recycled pyrolysis gas, char or a supplemental fuel. The biomass is fed by an auger into the bed above the heat exchanger. Pyrolysis vapor, gases, char and sand dust formed by attrition of the sand particles are swept out of the bed by the fluidizing gases and into a cyclone separator located at the top of the reactor. Char and sand dust are separated and flow downward from the cyclone through the hot gas combustor to a screw conveyor for removal to a collection bin. The pyrolysis vapor and gases are carried from the cyclone separator to a condenser and a demister.

A 7.8 cm diameter laboratory bubbling bed reactor is described by Boateng, et al, Bench-Scale Fluidized-Bed Pyrolysis of Switchgrass for Bio-Oil Production, Ind. Eng. Chem. Res. 2007, 46, 1891-1897. This reactor is operated with a fluidizing gas superficial velocity of 65 cm/sec. It has a biomass pyrolysis capacity of 2.5 kg/hr. The data reported imply a mass velocity or scaling factor of 520 kg/hr/m2.

A 2005 U.S. Department of Energy publication reported that the fluidized bed reactor of the Thermochemical Users Facility at the National Renewable Energy Laboratory is a 1.8 m high cylindrical vessel 20 cm diameter in the lower (fluidization) zone, expanded to 36 cm diameter in the freeboard section. It is equipped with a perforated gas distribution plate and an internal cyclone to retain entrained bed media, typically sand. The reactor is heated electrically and can operate at temperatures up to 700° C. at a throughput of 15-20 kg/h of biomass. The NREL data imply a mass velocity of 480-640 kg/hr/m2.

The equipment required for operating the fluidized bed reactor in addition to the biomass preparation and feeding equipment include; (1) a vertical tubular reactor containing the fluidized sand bed and related freeboard volume, (2) a tank to receive and store replacement sand, (3) an elevator to transfer replacement sand into the reactor, (4) a tubular heat exchanger or other means transferring heat into the sand bed, (5) a burner to supply heat to the exchanger, (6) an air blower for the burner, (7) a cyclone separator for separating char and sand dust from the pyrolysis vapor and gases, (8) a blower and pipeline for recycling pyrolysis gases to the fluid bed reactor.

PyNe Newsletter #27 reports that the 4,000 kg/hr unit built by Ensyn Corporation in Renfrew, Ontario, is the largest existing circulating bed fast pyrolysis unit. The Ensyn technology is covered by U.S. Pat. Nos. 5,961,786, 6,485,841 B1 and patent application publication US 2009/0266380 A1, October 2009. A vertical tubular reactor is specified with a base section where the biomass particles are rapidly mixed with hot inorganic particles, typically sand, and recycled gas. The size of the biomass particles is typically less than 6 mm and the size of the inorganic particles ranges from 0.04 and 0.4 mm. The ratio of the mass of the sand to the mass of the biomass particles is specified to be greater than 12:1. The recycle gas/biomass ratio is not specified, however a recent Pacific Northwest National Laboratory report (S. Jones, et al, Production of Gasoline and Diesel from Biomass via Fast Pyrolysis, Hydrotreating and Hydrocracking: A Design Case, PNNL-18284 Rev 1, DOE Contract DE-AC05-76RL01830, February, 2009) indicates this ratio is near 0.9. The mixed particles and recycle gas flow upward at superficial velocities greater than 2 meters per second and the pyrolysis reactions are completed in reactor residence times less than 2 seconds. Reactor biomass throughput rates are specified to be greater than 3,910 kg/hr/m2.

Sand, recycle gas and pyrolysis products flow out of the top of the reactor into a cyclone separator or multiple cyclone separators where the sand and pyrolysis char are separated from the gas and vapor. Char is combusted in a fluidized bed to heat the sand particles. Make-up sand to replace attrition is fed with recycle sand to the circulating bed.

The equipment required for operation of the circulating bed pyrolysis reactor in addition to the biomass preparation and feeding equipment include; (1) a vertical tubular reactor for mixing biomass particles, hot sand particles and recycled gas, (2) a tank to receive and store replacement sand, (3) an elevator to transfer replacement sand into the sand heater, (5) a recycle gas blower to convey recycled gas to the pyrolysis reactor, (5) a cyclone for separating coarse char and sand from gas and vapor, (6) a cyclone for separating fine char and sand dust from the gas and vapor, (7) a sand heating vessel containing the fluidized sand and char particles, (8) a sand heater air blower for fluidizing the sand and combusting the char particles, (9) a cyclone for separating fine char and sand dust from the sand reheater flue gases, (10) a thermal oxidizer vessel for char fines, (11) a thermal oxidizer air blower, (12) a thermal oxidizer bag house.

A recent publication by R. C. Brown and J. Holmgren (Fast Pyrolysis and Bio-Oil Upgrading, Advanced Biofuels USA, Dec. 29, 2009) discussed the relative merits of various reactors and concluded auger mix reactors offered lower inert gas requirements and lower complexity than fluid or circulated beds. PyNe Newsletter #27 reports a demonstration scale auger mix pyrolysis reactor being developed by the Karlsruhe Institute of Technology (KIT) was commissioned in Germany in 2008. The KIT reactor has a design capacity of 12 tonnes per day of dried biomass such as straw. The design specifies sand to biomass ratios in the range of 5:1 to 10:1. Therefore, from 60 to 120 tonnes per day of sand heated to 550-600 C is fed to this reactor to rapidly heat 12 tonnes of straw to 500 C. The biomass and char are mixed in a horizontal tubular reactor by twin screws. The straw particles rapidly decompose to oil vapor, non-condensable gases and char. The residence time of the vapors and gases in the reactor is approximately 3 seconds.

Replacement sand is added to the biomass feed stream to compensate for dust forming attrition of the sand particles as they flow through the reactor and recirculation system. The sand attrition rate is stated to be about 1% of the biomass feed rate. Vapors, gases, sand dust and char flow out of the top of the reactor and into a cyclone above the reactor where fine char and sand dust are separated and sent to a screw cooler and collection vessel. The oil vapors and non-condensable gases flow out of the cyclone into two condensers in series. Sand and char flow out of the bottom of the reactor into a surge tank and then to a lift pipe where they are picked up by hot air and combustion gases from a pyrolysis gas burner. The lift pipe carries the sand and char up to a separation tank above the reactor. Char particles are combusted in the lift pipe to supplement the pyrolysis gas. The combustion gases flow out of the sand separator tank and into cyclone separator, a filter and then into a flare stack.

The equipment required to operate the auger-mix pyrolysis reactor in addition to the biomass preparation and feeding equipment include: (1) a tubular reactor encasing twin mixing augers, (2) a tank to receive and store replacement sand, (3) an elevator to transfer replacement sand into the biomass feed line, (4) a heated sand separation tank located above the reactor, (5) a sand discharge surge tank located below the reactor, (6) a solids transfer pipe between the sand discharge surge tank and lift pipe, (7) a lift pipe to carry the sand back to the separation tank above the reactor, (8) a sand heating burner to combust pyrolysis gas and provide hot gas for the lift pipe, (9) an air blower for the sand heating burner, (10) a cyclone for removing char and sand particles from the combustion gases, and (11) a filter downstream of the cyclone.

SUMMARY OF THE INVENTION

The instant invention is an apparatus and methods for producing oils by pyrolysis of carbonaceous materials such as wood waste, corn stover, switchgrass, chicken litter or sorted municipal solid waste such as plastics. The solid material is fed to a rotary reactor consisting of; a cylindrical reaction section heated in the preferred embodiment by multiple high intensity gaseous fueled burners located and controlled to optimize heat transfer into the materials being heated, a feed section with an auger arrangement that suppresses slow heating of the material until the particles reach the area where optimized heat transfer begins, a withdrawal section with a stationary end closure supporting a char outlet and a horizontal vapor and gas withdrawal pipe closely connected to a first condenser and a first condenser designed to eliminate shut downs due to plugging at the condenser vapor entrance.

Both the feed section and the withdrawal section rest on steel tyres that enable rotation of the reactor. The tyres are fastened by welding or other means of metal to metal contact with the rotating cylinders and heat conduction through the fastenings causes significant heat loss. In the instant invention this heat loss is reduced by making the diameter of the feed section substantially smaller than the diameter of the heated section. Heat loss from the discharge section is also be achieved by a reduction in diameter or, alternatively, by a baffle placed near the end of the heated section.

Developmental testing showed that rotary reactor oil yields are increased by suppressing slow heating of the material until the particles reach the area where optimized heat transfer begins. In this invention slow heating is suppressed by controlling the temperature of the feed auger and extending its length such that the particles fall from the auger outlet onto reactor surfaces at near the optimum pyrolysis temperature.

The location and control of the multiple burners of this invention are described in a prior patent application of the first named inventor of this invention. The prior patent application, dated May 21, 2009, Pub. No. US 2010/0294700, is entitled "Method and Apparatus for Maximizing Throughput of Indirectly Heated Rotary Kilns". The prior application is based on mathematical computations of the heat transfer that occurs as the solid particles are transported through sloped rotary reactors. These computations resulted in the conclusion that the heat transfer resulting from direct contact of the particles with the inner surface of the reactor was the dominant mode of heat transfer. It was further determined that particle heat transfer could be optimized by positioning high intensity burners such that the flow of the combustion products impacted the outer surface of the reactor where its inner surface was in contact with the particles.

The design of the heating system of the reactor of this invention is intended to prevent the overheating of the pyrolysis vapors which results in decomposition into solid carbon and non-condensable gases. Oil yields are optimized by controlling the burners singly or in pairs to maintain optimum reactor wall temperatures.

Substantially less auxiliary equipment is required for operation the reactor of this invention than existing pyrolysis units that achieve rapid heating of biomass particles by contact with sand or metal particles.

In addition to the biomass preparation and feeding equipment, the additional equipment used to operate the reactor is;

a means to rotate the kiln, multiple burners that heat the kiln, a blower for recycling product gas to the burners, and a blower to supply air to the burners.

The production of char which is free of fine sand or metal particles is a second unique advantage provided by the present invention.

This invention incorporates a unique pipe line that conveys oil vapor from the reactor to the first condenser. The design of this pipe line minimizes unnecessary residence time within the reactor and subsequent degradation of the produces gasses. The pipe line also minimizes the time required for flow from the reactor to the first condenser. The near horizontal reactor of this invention enables the use of a short, straight pipe line.

A common practice to avoid plugging is to heat the pipe line. However, at the condenser end of this pipeline it is connected to the relatively cold metal of the condenser and it is difficult to apply sufficient heat to this connection to prevent plugging. Our invention includes a method of removing tar or oil plugs at the end of this pipeline. The plug is removed by a drill that is inserted into the piping connection from inside the condenser vessel.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figures 1, 3:
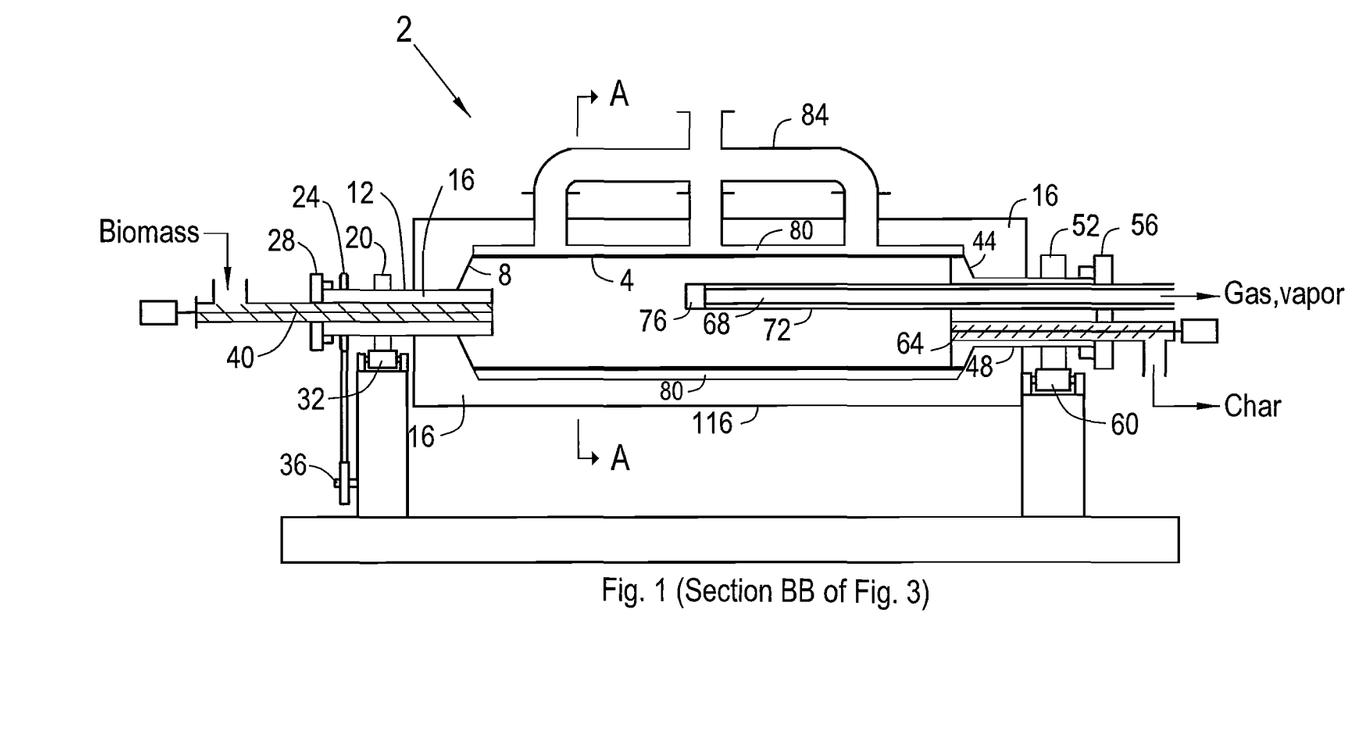
FIG. 1 is a view of a longitudinal section of a rotary reactor of the present invention.
FIG. 3 is a view of a transverse section of the rotary reactors of FIGS. 1, 2 and 11.

FIG. 1 is a longitudinal section view of a rotary reactor 2 according to the present invention. The reactor body is formed by a (typically metal) heated cylinder 4. The body 4 is connected to an inlet reducer 8 and thereby to an inlet feed tube 12. The inlet reducer 8 and reduced diameter feed tube 12 reduce heat loss. The body 4, inlet reducer 8 and feed tube 12 are insulated with a refractory insulation 16. The inlet feed tube 12 is attached to tyre 20, drive sprocket 24 and fits into stationary end seal 28. Tyre 20 rests on rollers 32. A chain drive system 36 or other similar drive is connected to sprocket 24 and drives the rotation of the reactor. A feed auger 40 extends through the fed tube 12 and into the reactor body 4. The auger 40 is encased with refractory insulation 16 or a cooling jacket.

The reactor body 4 is also connected to an outlet reducer 44 which is backed by refractory insulation 16. The reduction in diameter at this point also reduces heat loss. Outlet reducer 44 is attached to an outlet tube 48 which is attached to tyre 52, and stationary end seal 56. Tyre 52 rests on rollers 60. Char is withdrawn from the reactor through auger 64. The reactor body 4 may be equipped with vanes at the point of connection to reducer 44 which help transport char into the auger 64.

A vapor and gas outlet pipe 68 withdraws pyrolysis vapors and gases from a point near the center of the reactor body 4. Placement of the gas outlet pipe 68 near the center of the reactor body 4 provides for a low residence time for the oil and gas vapors and helps to keep the oil vapors from disintegrating into carbon and non-condensable gasses. The outlet pipe 68 is preferably linear and connects without elbows directly to a first condenser. Heat tracing 72 may surround at least a portion of this pipe in order to suppress vapor condensation. The outlet pipe is typically supported by the stationary end seal 56. The outlet pipe 68 is typically equipped with an inlet filter 76 to keep char from passing through the outlet pipe 68. An annular combustion and exhaust chamber 80 surrounds the reactor body 4, allowing combustion and exhaust gasses to flow around the reactor body 4 and up to exhaust pipes 84.

Figures 2, 3:
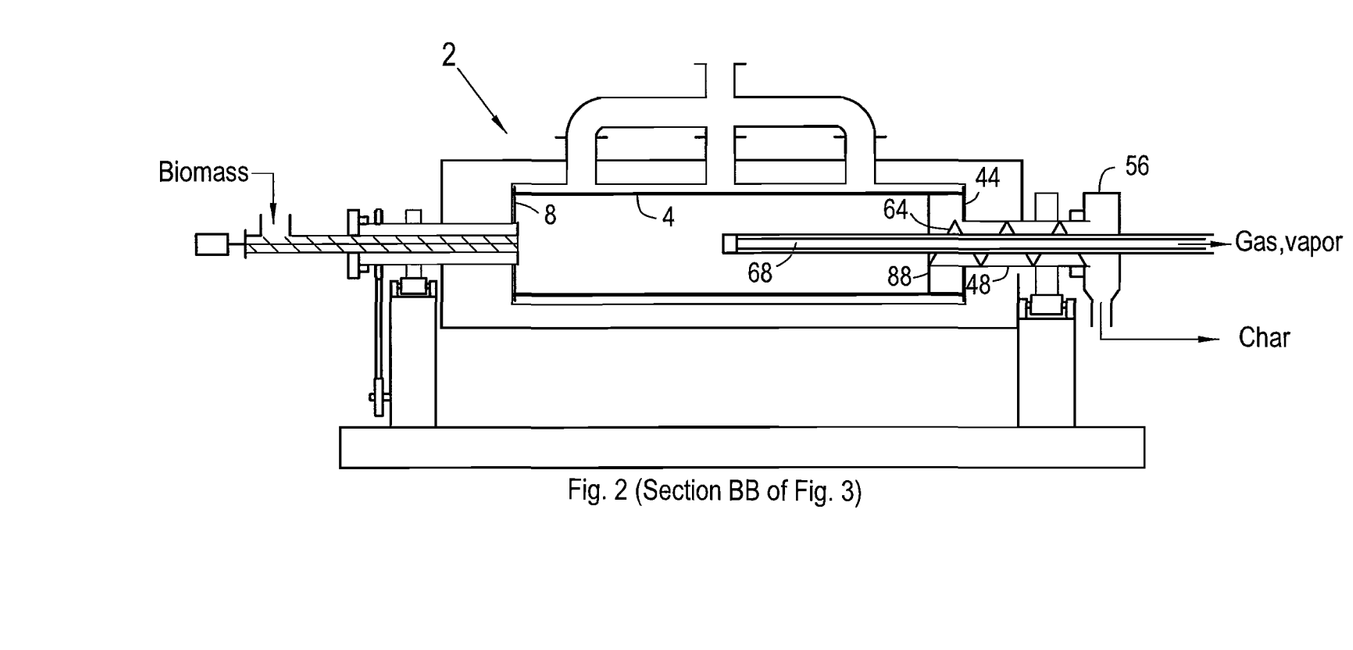
FIG. 2 is an alternative view of a longitudinal section of an rotary reactor of the present invention.

FIG. 2 is a longitudinal section view of an alternative embodiment of the rotary reactor. For clarity, not all structures are labeled and discussed. Unless otherwise noted, un-numbered structures which are also present in FIG. 1 have the same name and functionality. As shown, the inlet reducer flange 8 and outlet flange 44 are flat rather than conical. The gas outlet pipe 68 is centered in the reactor body 4. A char outlet auger 64 which is concentric with the gas outlet pipe 68 and the reactor outlet tube 48 is used. The outlet char auger 64 is attached to and driven by the outlet tube 48 and is not attached to the gas outlet pipe 68. Blades 88 may be added to the outlet end of the reactor body 4 to convey char into the char auger 64.

FIG. 3 presents a view of a transverse cross section of a rotary reactor of the present invention. This view shows the location of the rolling bed of solid particles 92 inside the reactor body 4. The direction of rotation of the reactor body is shown by arrow 96, and the circulation path the solid particles 92 follow is indicated by arrow 100. The top of the rolling bed of particles is generally flat and disposed at the angle of repose of the material. As particles are carried upward and reach the top surface of the material, they begin to fall downward. When the falling particles reach the lower portion of the kiln wall they remain near stationary with respect to the heated wall until they again reach the top of the rotating bed.

The particles 92 which are in contact with the kiln wall 4 draw heat very rapidly. A high intensity burner 104 is directed toward the outside of the reactor wall at the location where the inside of the wall is in contact with the particles 92. The burner 104 is disposed such that an extension of the centerline of burner 104 intersects the center of mass 108 of the circulating bed 92. The burner 104 is disposed such that the burner is directed towards the reactor body 4 and the burner flames and combustion gasses 124 directly contact the reactor body 4. More preferably, the burner is disposed such that the burner 104 is also directed towards the center 112 of the reactor body 4. It will be appreciated that, while a single burner is shown in the present view, multiple burners 104 are present along the length of the reactor body 4 to heat the reactor.

Recycled pyrolysis gas and natural gas is combusted in the burners 104 to heat the reactor. It has been determined that, in many cases, the non-condensable gas products will supply the necessary energy to heat the reactor. The condensable gasses (oil) and the char are collected as useful products. Thus, the present reactor is largely self-sufficient while converting waste and byproducts into usable products. Hot combustion products flowing at high velocity directly impact the reactor body wall 4 and then flow through annular exhaust passages 80. Refractory insulation 16 surrounds and may form the exhaust flow passages 80. Burner 104 and refractory insulation 16 are supported by a steel outer shell 116. A device 120 that senses the temperature of the kiln wall 4, preferably an infra red sensor, is located at a convenient location on the outside of the refractory insulation 16. The sensor is connected to a burner control system that adjusts the fuel flow to maintain a specified temperature set point. Experimentally measured product yields are used to determine the optimum set point temperatures for different feed materials.

Figures 3, 4:
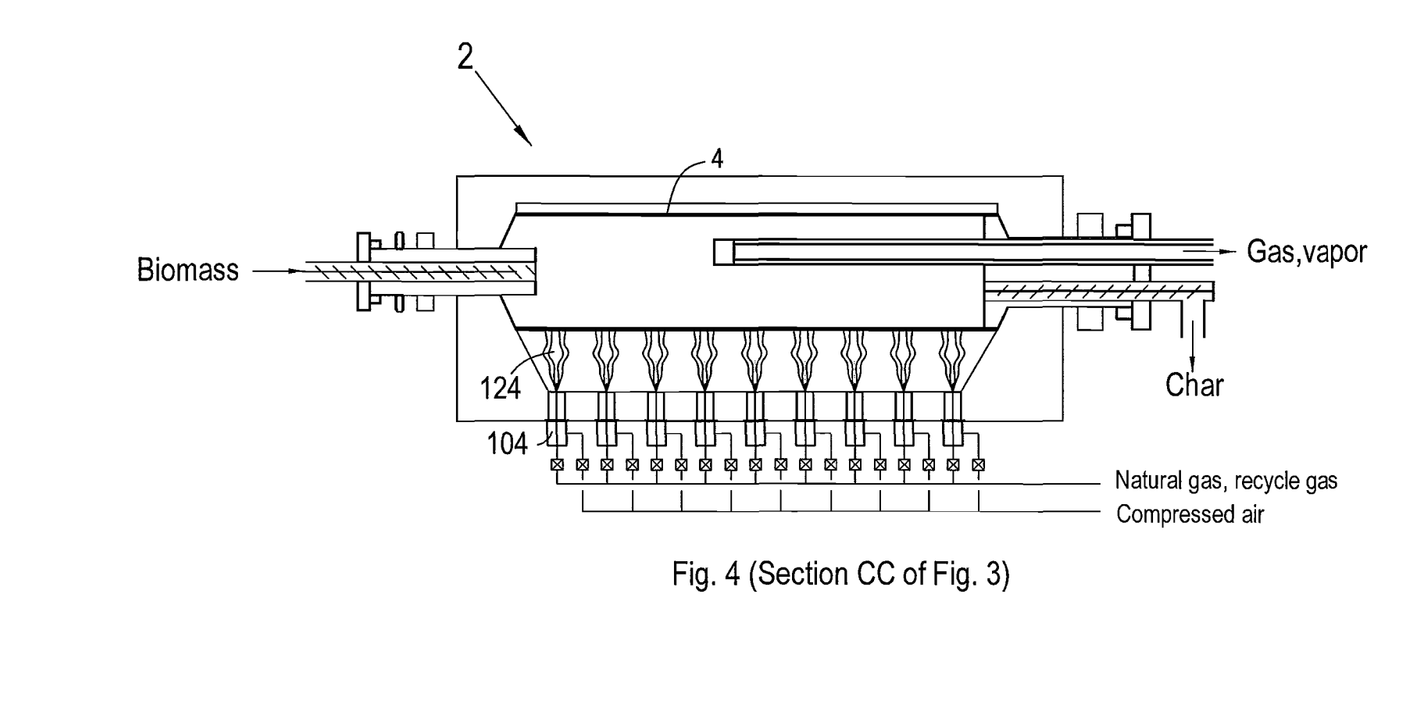
FIG. 4 is a view of a longitudinal section through the center of the burners of a present rotary reactor applicable to the reactors of FIGS. 1, 2 and 11.

FIG. 4 is a view through section CC of FIG. 3. This view shows the arrangement of burners 104 along the heated length of the reactor body 4. Single burners 104 or adjacent pairs of burners are controlled to maintain the set point temperatures. Mathematical model computations have shown that the highest combination of oil yield and throughput rate is achieved when the temperate is uniform along the heated length. This requires the burners near the inlet to be fired at a higher rate than the burners near the outlet. A near uniform temperature avoids overheating the oil vapors causing further decomposition into carbon and non-condensable gases.

Figure 5:
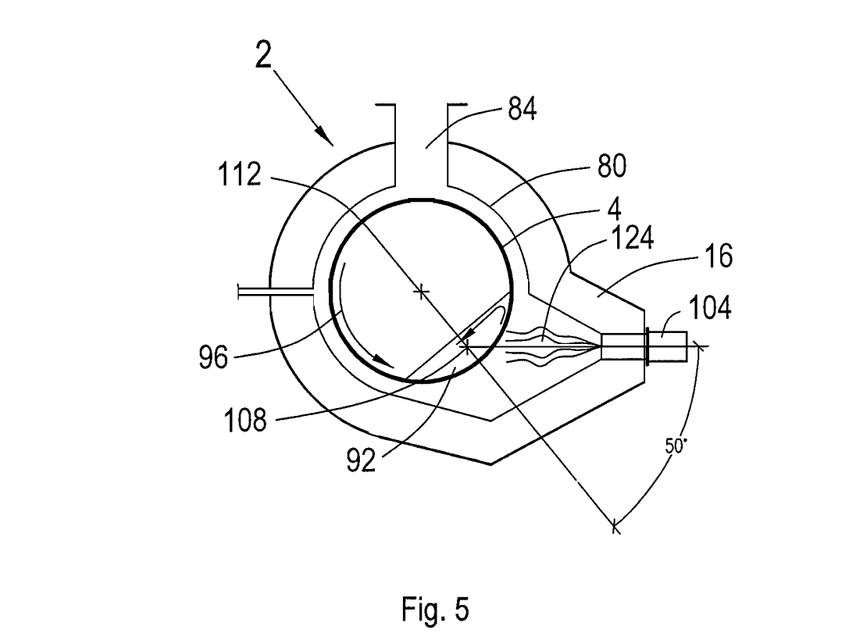
FIG. 5 is a view of a transverse section of the rotary reactors of FIGS. 1, 2 and 11.
Figure 6:
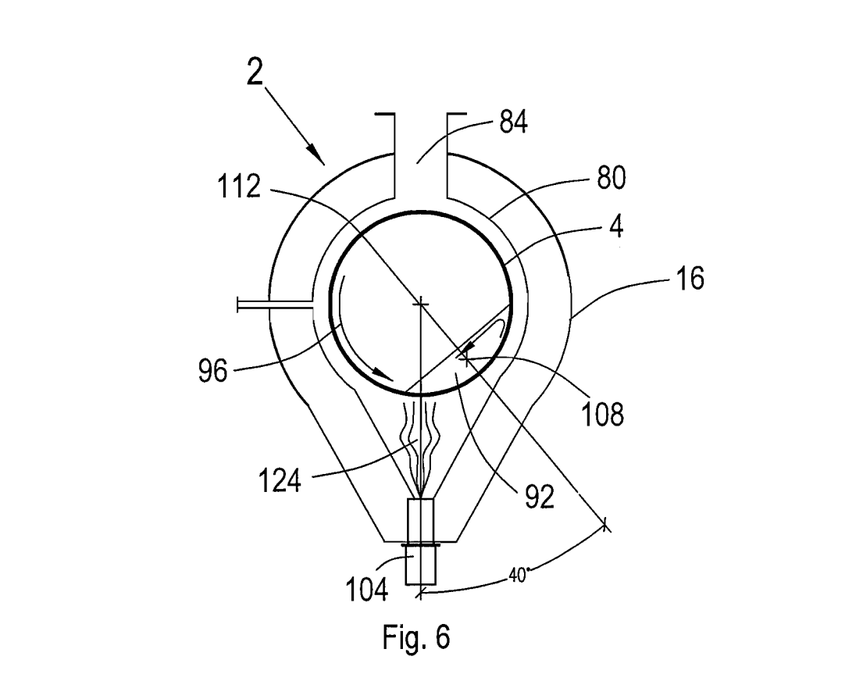
FIG. 6 is a view of a transverse section of the rotary reactors of FIGS. 1, 2 and 11.

FIG. 5 and FIG. 6 present alternate views of a transverse cross section of the rotary reactor of the present invention. FIG. 5 shows a configuration where the burner 104 is disposed to place the burner centerline (and thus the flame 124) where it intersects the center of mass 108 of the circulating bed of material 92 as well as contacting the reactor body 4. As shown, the burner forms an angle of about 50 degrees with an extension of a line between the center 112 of the reactor body 4 and the center of mass 108 of the material 92. FIG. 6 shows a configuration where the burner centerline and flame 124 are directed towards the center 112 of the reactor body 4 but contact the reactor body 4 upstream of the center 108 of the biomass material 92 relative to the rotation of the reactor body 96.

Figure 7:
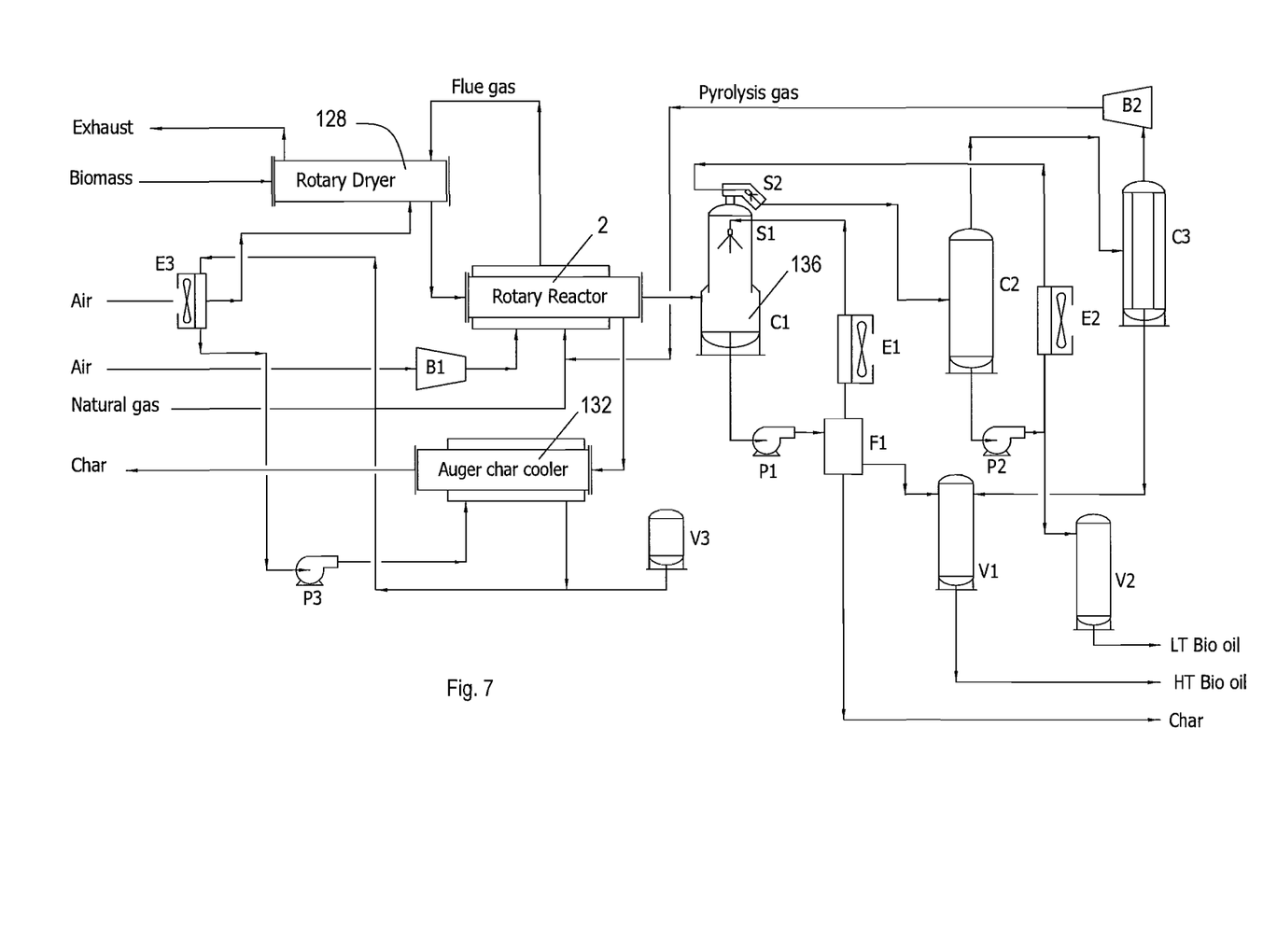
FIG. 7 is a flow diagram of a preferred embodiment of a bio oil and bio char production system consisting of the present rotary reactor and other process components.

FIG. 7 presents a flow diagram of an embodiment of a fast pyrolysis system that would process moist biomass into two grades of bio oil. Moist biomass would first be fed into a rotary dryer 128 together with hot combustion products (exhaust gasses) from rotary reactor 2, designed as described above, and air blown through and heated by heat exchanger E3. Char discharged from rotary reactor 2 is conveyed by an auger or other means through char cooler 132. Heat transfer fluid pumped through char cooler 132 by pump P3 also flows through exchanger E3. Expansion of the heat transfer fluid is accommodated by vessel V3. Vapors and gases discharged from rotary reactor 2 flows into condenser 136 (C1) where they are cooled by direct contact with recycled oil flowing through sprayer or multiple sprayers S1. Oil flows from the bottom of C1 through pump P1 into filter F1. A portion of the oil leaving F1 flows through air-cooled exchanger E1 and into S1. The remainder of the oil leaving F1 flows into storage tank V1. Flow into V1 is controlled such that a constant liquid level is maintained near the bottom of C1. Air flow through E1 and the pumping rate of P1 are regulated to maintain a specified oil temperature at the top of C1.

Gas and vapors leaving the top of C1 flow into spray chamber S2 where they are contacted by oil recycled from condenser C2. Concurrent flow of the mixture through the pipe line connecting S2 and C2 cools and condenses the oil vapors. Oil leaving C2 flows through pump P2 and a portion also flows into air-cooled exchanger E2 and into spray chamber S2. The quantity of oil flowing through E2 and the fan speed of E2 are controlled to maintain a specified temperature at the outlet of C2. The remainder of the oil leaving C2 flows into storage tank V2. Flow into V2 is controlled such that a constant liquid level is maintained near the bottom of C2.

Gases and aerosols flow out of the top of C2 into electrostatic precipitator C3 where aerosols are condensed. The condensed oil flows into storage tank V2. Incondensable gases flow from the top of C2 through blower B2 and then back to the fuel gas manifold of reactor 2 where they mix with natural gas as needed and are then combusted to heat the kiln reaction chamber.

Figure 8:
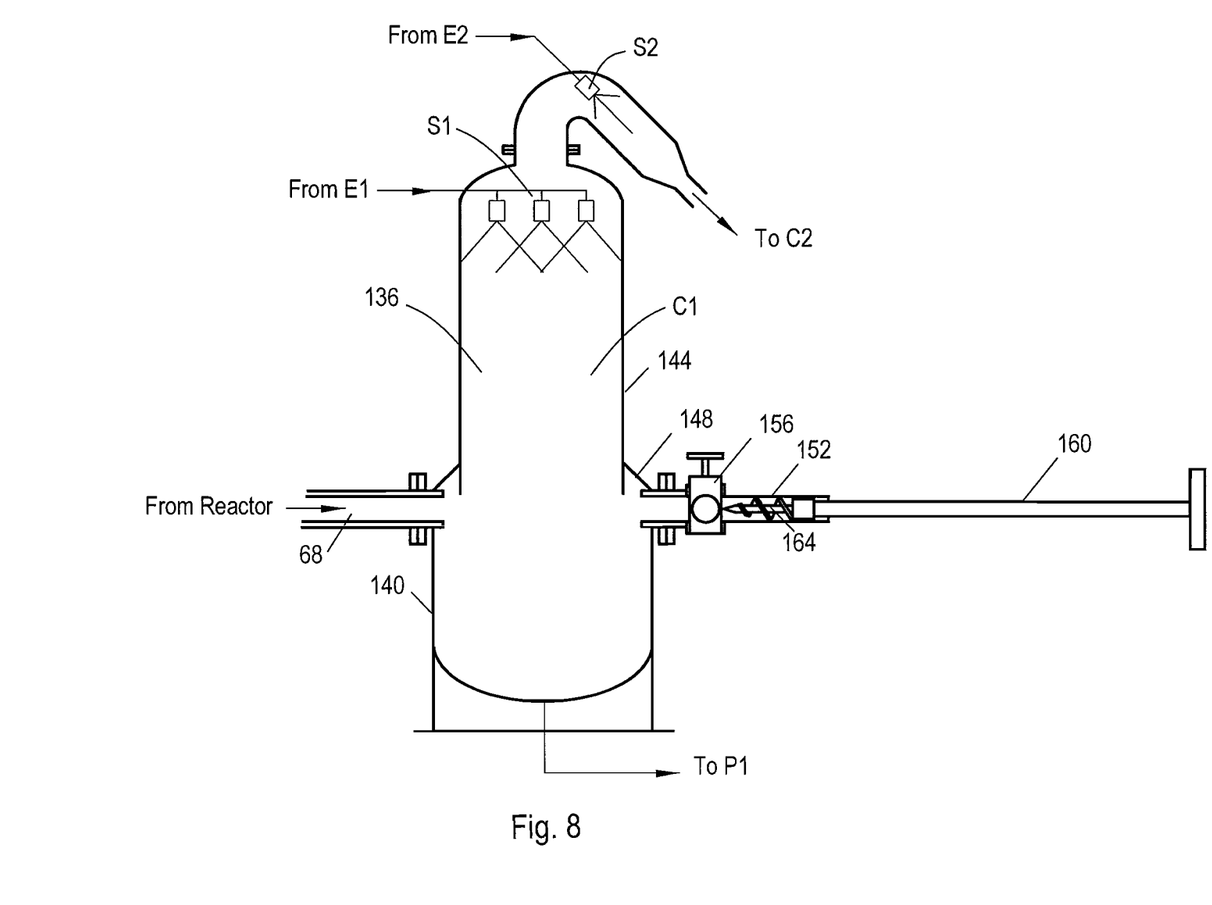
FIG. 8 is a vertical section of a condenser of the present invention.

FIG. 8 presents a vertical section through the center of condenser 136 (C1). The condenser consists of lower cylinder 140 and upper cylinder 144. Cylinder 144 is smaller in diameter than cylinder 140 and extends below connecting reducer 148. This extension prevents oil flowing down the inner surface of cylinder 144 from dropping onto and cooling the end of the gas outlet pipe 68 carrying oil vapors and gases from the pyrolysis reactor. Oil flows from exchanger E1 through sprayer manifold S1 into the top of cylinder 144, cooling the rising vapors and gases and condensing a portion of the vapors. The gases and the non-condensed vapors leave the top of cylinder 144 and enter spray section S2 where they mix with oil flowing from exchanger E2 and then flow into condenser vessel C2.

Figure 9:
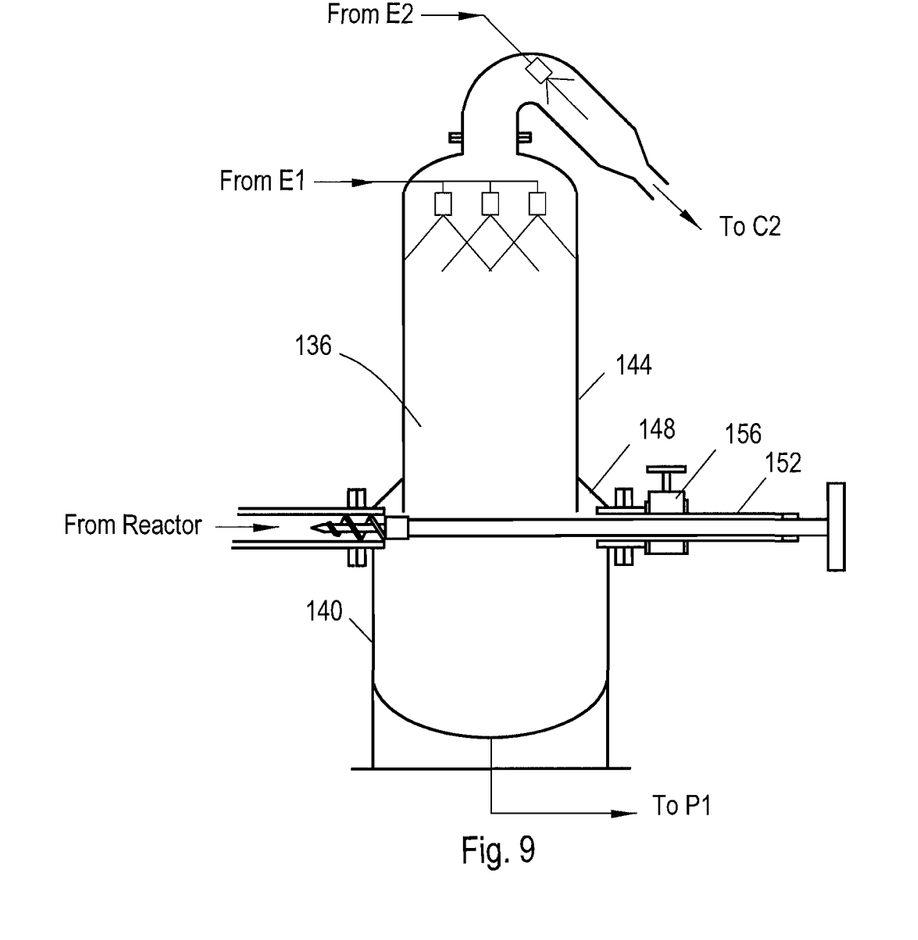
FIG. 9 is a vertical section of a condenser of the present invention.
Figure 10:
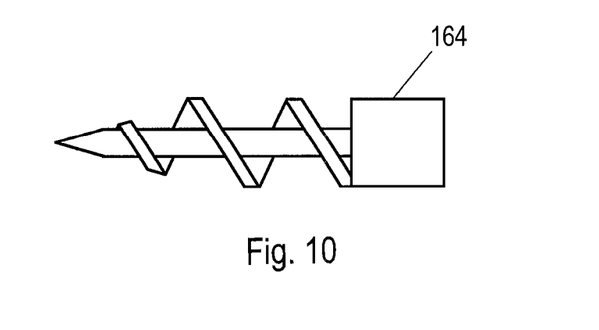
FIG. 10 shows a cleaning drill as illustrated in FIGS. 8 and 9.

FIGS. 8 through 10 show how, according to the present invention, the gas outlet pipe 68 can be kept clean. An access pipe 152 is attached to the condenser 136 directly opposite and in alignment with the gas outlet pipe 68. The access pipe 152 is selectively isolated from the condenser by a valve 156 which, when open, allows unobstructed access through the pipe 152. It will be appreciated that the gas outlet pipe 68 will develop tar deposits during use. When necessary, the valve 156 is opened and a clearing drill 160 is inserted through the access pipe 152 and into the gas outlet pipe 68 to clear deposits from the outlet pipe. The clearing drill 160 includes an auger or drill bit shaped tip 164 which removes deposits from the outlet pipe 68. Because the access pipe 152 (or an access port) is directly in line with the gas outlet pipe 68, cleaning is easy and does not require shutdown of the equipment.

FIG. 9 shows the clearing drill 160 extended into the outlet pipe 68 to remove deposits of oil and char dust. During retraction of drill 160, the spray of oil droplets from S1 removes oil and particulates from the drill tip 164. FIG. 10 presents a larger view of drill tip 164.

Figures 3, 11:
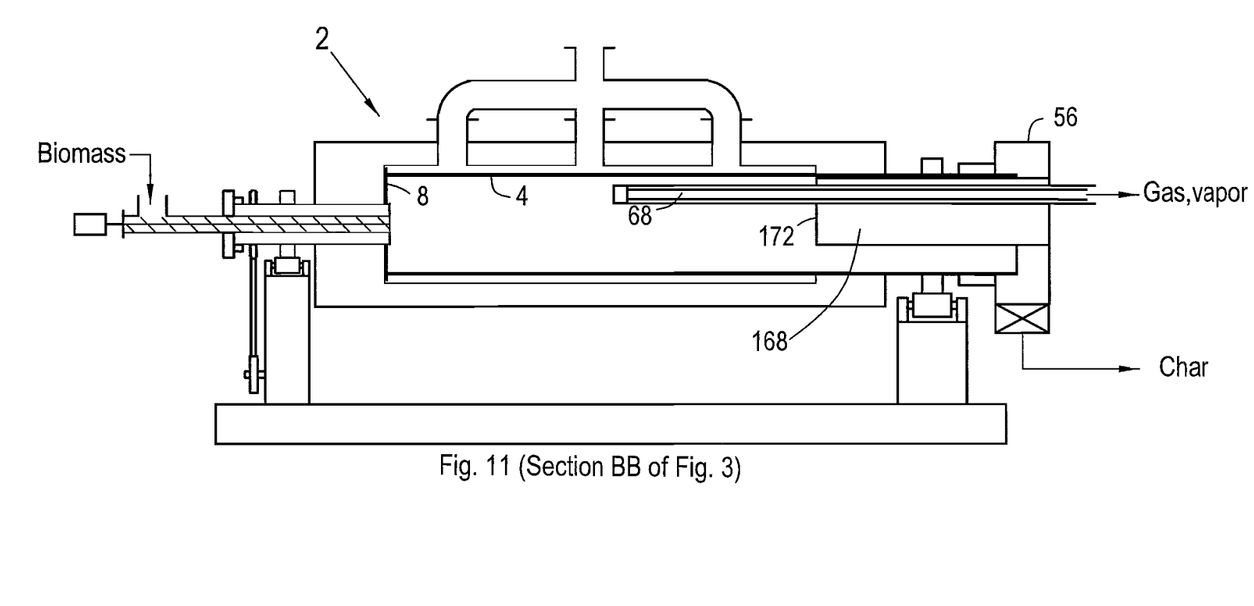
FIG. 11 is an alternative view of a longitudinal section of a rotary reactor of the present invention.

FIG. 11 shows another longitudinal section view of a reactor 2 according to the present invention. Many of the reactor structures are the same as those shown in FIGS. 1 and 2, and are not labeled for clarity. The reactor body 4 does not have the same style of outlet reducer as shown in FIG. 2 (structure 44). Instead, the reactor body 4 is longer and extends further on the outlet side. An outlet reducer 168 is present. The outlet reducer 168 is generally cylindrical and has a closed first end 172 which faces into the reactor body 4. The outlet reducer 168 is approximately two thirds the diameter of the reactor body 4 and is installed near the top of the reactor body 4 to leave some space between the bottom of the outlet reducer and the bottom of the reactor body. The outlet reducer helps to prevent heat loss out of the reactor body 4. As such, the outlet reducer 168 shortens the effective length of the reactor body to the space between the inlet reducer 8 and the inside face of the outlet reducer 172. Typically, the length of the reactor body between the inlet reducer 8 and the outlet reducer face 172 is the heated portion of the reactor body. The outlet reducer 168 does not rotate with the reactor body 4.

The gas outlet pipe 68 extends through the center or upper portion of the outlet reducer 168 to a point approximately half way between the inlet reducer 8 and the outlet reducer front face 172 to withdraw produced gasses from the midpoint of the reactor body rather than the outlet end of the reactor body. Char flows between the reactor body 4 and the outlet reducer 168 where it exits the reactor 2.

EXAMPLES

A bench scale rotary reactor of the present invention was operated with the feed stocks, feed rates, kiln temperatures and other run conditions set out below. The internal diameter of this reactor is 15 cm and its heated length is 122 cm.

Example 1

| Material | wood waste pellets |
|---|---|
| Material moisture | 6.25% |
| Particle diameter | 6 mm |
| Particle length | 6 mm-25 mm |
| Rotation rate | 18 rpm |
| Slope, degrees | 1.0 |
| Reactor cylinder temperature | 450° C. |
| Feed Rate | 10.4 kg/hr |
| Run Time | 24 hours |
| Total material fed | 250.2 kg |
| Total oil condensed | 154.9 kg |
| Total char collected | 56.7 kg |
| Yields, % of dry material fed: | |
| Oil Condensed | 66.0% |
| Oil Produced | 59.4% |
| Char | 24.2% |
| Gas (by difference) | 16.4% |
| Oil high heating value, MJ/kg of dry feed | 16.9 MJ/kg |
| Condenser 1 gas outlet temp | 60° C. |
| Condenser 1 oil recycle rate | 4 gpm |
| Spray nozzle orifice size | 0.22 inches |
| Solid cone spray angle | 60 degrees |
| C1 inlet clean out interval | 51 minutes |

The fast pyrolysis classification of the reactor and products produced in this bench scale test is substantiated by comparing the yield data with yields produced by fluidized bed and circulating bed reactors. In a paper published in 2010 by Westerhof, et al, fluidized bed fast pyrolysis yields for 1 mm pine wood particles were reported to be 45% kg organic oil, 12% produced water, 16% char and 17% gas. A 2007 publication by M. Van de Velden, et al, of the University of Birmingham, presented a graph of bio-oil yields versus reaction temperature for circulating sand reactors at seven different locations. Oil yields at 500° C. ranged from 54% to 64%.

Example 2

| Material | wood waste pellets |
|---|---|
| Material moisture | 6.9% |
| Particle diameter | 6 mm |
| Particle length | 6 mm-25 mm |
| Rotation rate | 18 rpm |
| Slope, degrees | 1.0 |
| Reactor cylinder temperature | 450° C. |
| Feed Rate | 20.1 kg/hr |
| Run Time | 0.6 hours |
| Total material fed | 12.71 kg |
| Total oil condensed | 8.43 kg |
| Total char collected | 3.44 kg |
| Yields, % of dry material fed: | |
| Oil Condensed | 71.2% |
| Oil Produced | 63.8% |
| Char | 29.1% |
| Gas (by difference) | 7.1% |
| Reactor mass velocity | 1340 kg/hr/square meter |

As noted above, reported mass velocities of fluid bed reactors are in the range 480-640 kg/hr/square meter.

Example 3

| Material | wood waste fines |
|---|---|
| Material moisture | 8.3% |
| Particle diameter | 66% < 1.2 mm |
| Rotation rate | 18 rpm |
| Slope, degrees | 1.0 |
| Reactor cylinder temperature | 450° C. |
| Feed Rate | 6.8 kg/hr |
| Run Time | 2 hours |
| Total material fed | 14.07 kg |
| Total oil condensed | 8.66 kg |
| Total char collected | 2.996 kg |
| Yields, % of dry material fed: | |
| Oil Condensed | 67.1% |
| Oil Produced | 58.1% |
| Char | 23.2% |
| Gas (by difference) | 18.7% |

Example 4

| Material | Pine wood sawdust |
|---|---|
| Material moisture | 7.2% |
| Particle diameter | <0.84 mm |
| Rotation rate | 18 rpm |
| Slope, degrees | 1.0 |
| Reactor cylinder temperature | 450° C. |
| Feed Rate | 5.2 kg/hr |
| Run Time | 3 hours |
| Total material fed | 15.62 kg |
| Total oil condensed | 9.7 kg |
| Total char collected | 3.33 kg |

-continued

| Material | Pine wood sawdust |
|---|---|
| Yields, % of dry material fed: | |
| Oil Condensed | 66.9% |
| Oil Produced | 59.2% |
| Char | 23.0% |
| Gas (by difference) | 17.8% |

There is thus disclosed an improved method and system for fast pyrolysis of biomass in rotary kilns. It will be appreciated that numerous changes may be made to the present invention without departing from the scope of the claims.

What is claimed is:

1. A rotating reactor for fast pyrolysis of carbonaceous material comprising:
 a generally horizontal cylindrical body having a first end and a second end opposite the first end;
 a drive which rotates the body;
 an inlet feed which deposits carbonaceous material into the first end of the body;
 a char outlet for removing char from the second end of the body;
 a gas outlet pipe for removing gasses from the body; and
 a burner disposed to heat the reactor body, wherein the burner comprises a flame axis and wherein flame produced by the burner is emitted along the flame axis, and wherein the burner flame axis intersects the body and is directed towards a longitudinal center axis of the body wherein the burner flame axis is directed towards a lower ascending quadrant of the reactor body, and wherein the burner flame axis is oriented about 50 degrees from horizontal.

2. The reactor of claim 1, wherein a portion of the inlet feed extends into the body and wherein the reactor comprises insulation enclosing said portion of the inlet feed.

3. The reactor of claim 1, wherein the burner flame axis intersects a center of the reactor body.

4. The reactor of claim 1, wherein the reactor further comprises a heater attached to a section of the gas outlet pipe external to the reactor to heat the section of outlet pipe.

5. The reactor of claim 1, wherein the gas outlet pipe extends linearly and connects without elbows into a condenser to transfer gasses thereto.

6. The reactor of claim 1, further comprising an access port located on the condenser which is aligned with a longitudinal axis of the gas outlet pipe and which may be selectively opened and closed, and further comprising a cleaning drill inserted through the access port, through the condenser, and into the gas outlet pipe to remove deposits from the gas outlet pipe.

7. The reactor of claim 6, wherein the access portion comprises a valve which may be selectively opened and closed to allow insertion of the cleaning drill therethrough.

8. The reactor of claim 1, further comprising an outlet reducer attached to the second end of the reactor body to close the second end of the reactor body, wherein the gas outlet pipe extends through the outlet reducer, and wherein the char outlet extends through the outlet reducer.

9. The reactor of claim 8, wherein the char outlet comprises an outlet tube.

10. The reactor of claim 8, wherein the char outlet comprises an auger.

11. A pyrolysis rotary reactor comprising:
 a cylindrical reactor body having a first end and a second end, the reactor body being disposed generally horizontally;
 a burner disposed to heat the reactor body, wherein the burner emits flame along a flame axis, wherein the flame axis is directed towards a lower portion of the reactor body which is ascending due to rotation of the reactor body and which is located at an angle of about 50 degrees below horizontal;
 an inlet feed disposed at the first end;
 an outlet disposed at the second end for removing solid material from the reactor body; and
 a gas outlet pipe.

12. The reactor of claim 11, wherein the inlet feed comprises a feed auger, wherein a section of the feed auger extends into the reactor body, and wherein an exterior surface of the section of the feed auger is covered with insulation.

13. The reactor of claim 11, further comprising an outlet reducer attached to the second end of the reactor body to generally close the second end of the reactor body, wherein the gas outlet pipe extends through the outlet reducer, and wherein the char outlet extends through the outlet reducer.

14. The reactor of claim 11, wherein the burner is oriented such that the flame axis is directed towards a longitudinal central axis of the reactor body.

15. The reactor of claim 11, wherein the burner is oriented such that the flame axis is oriented upwardly towards the reactor body at an angle of about 50 degrees below horizontal.

16. A rotating reactor system for pyrolysis of carbonaceous material comprising:
 a generally horizontal cylindrical body having a first end and a second end opposite the first end;
 a burner disposed to heat the reactor body;
 a drive which rotates the body;
 an inlet feed which deposits carbonaceous material into the first end of the body;
 a char outlet for removing char from the second end of the body;
 a gas outlet pipe for removing gasses from the body; and
 a condenser attached to the gas outlet pipe;
 an access port located on the condenser which is aligned with a longitudinal axis of the gas outlet pipe and which may be selectively opened and closed, and further comprising a cleaning drill inserted through the access port, through the condenser, and into the gas outlet pipe to remove deposits from the gas outlet pipe; and
 wherein the gas outlet pipe extends linearly and connects without elbows into a condenser to transfer gasses thereto.

17. The reactor system of claim 16, further comprising an access port located on the condenser which is aligned with a longitudinal axis of the gas outlet pipe, and further comprising a cleaning drill inserted through the access port, through the condenser, and into the gas outlet pipe to remove deposits from the gas outlet pipe.

18. The reactor system of claim 16, wherein the burner emits a flame along a flame axis and wherein the flame axis is directed upwardly towards an ascending location on the reactor body at an angle of about 50 degrees below horizontal.

19. The reactor system of claim 16, wherein the burner emits a flame along a flame axis and wherein the flame axis is directed towards a longitudinal center axis of the reactor body.

20. A rotating reactor for fast pyrolysis of carbonaceous material comprising:
- a generally horizontal cylindrical body having a first end and a second end opposite the first end;
- a drive which rotates the body;
- an inlet feed which deposits carbonaceous material into the first end of the body;
- a char outlet for removing char from the second end of the body;
- a gas outlet pipe for removing gasses from the body; and
- a burner disposed to heat the reactor body; and
- a condenser having an access port located on the condenser which is aligned with a longitudinal axis of the gas outlet pipe and which may be selectively opened and closed, and further comprising a cleaning drill inserted through the access port, through the condenser, and into the gas outlet pipe to remove deposits from the gas outlet pipe.

21. A rotating reactor for fast pyrolysis of carbonaceous material comprising:
- a generally horizontal cylindrical body having a first end and a second end opposite the first end;
- a drive which rotates the body;
- an inlet feed which deposits carbonaceous material into the first end of the body;
- a char outlet for removing char from the second end of the body;
- a gas outlet pipe for removing gasses from the body; and
- a burner disposed to heat the reactor body, wherein the burner comprises a flame axis and wherein flame produced by the burner is emitted along the flame axis, wherein the burner flame axis intersects the body and is directed towards a longitudinal center axis of the body, wherein the burner flame axis is directed towards a lower ascending quadrant of the reactor body, and wherein the burner flame axis is oriented about 50 degrees from horizontal; and
- an outlet reducer attached to the second end of the reactor body to close the second end of the reactor body, wherein the gas outlet pipe extends through the outlet reducer, and wherein the char outlet extends through the outlet reducer.

* * * * *